(12) United States Patent
Shestak et al.

(10) Patent No.: US 8,767,258 B2
(45) Date of Patent: Jul. 1, 2014

(54) FORCE K PROCESSING IN A CMYK COLOR CONVERSION

(75) Inventors: Vladimir V. Shestak, Fort Collins, CO (US); Larry M. Ernst, Longmont, CO (US); Hong Li, Superior, CO (US); Jason C. Walp, Louisville, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 302 days.

(21) Appl. No.: 13/182,628

(22) Filed: Jul. 14, 2011

(65) Prior Publication Data

US 2013/0016370 A1    Jan. 17, 2013

(51) Int. Cl.
*H04N 1/60* (2006.01)
(52) U.S. Cl.
USPC .............................. 358/1.9; 358/3.23; 358/523
(58) Field of Classification Search
USPC .......... 358/1.1, 1.9, 3.23, 500, 501, 504, 518, 358/523
See application file for complete search history.

(56) References Cited

U.S. PATENT DOCUMENTS

| | | | |
|---|---|---|---|
| 5,677,967 A * | 10/1997 | Pariser | 382/167 |
| 7,259,893 B2 | 8/2007 | Falk et al. | |
| 7,859,722 B1 * | 12/2010 | Kulkarni | 358/1.9 |
| 2009/0279142 A1 | 11/2009 | Li et al. | |
| 2010/0195158 A1 | 8/2010 | Wen et al. | |
| 2010/0225939 A1 | 9/2010 | Gil et al. | |
| 2010/0245928 A1 | 9/2010 | Zhao et al. | |

\* cited by examiner

*Primary Examiner* — Thomas D Lee
(74) *Attorney, Agent, or Firm* — Duft Bornsen & Fettig LLP

(57) ABSTRACT

Force K processing is presented to replace gray color values of input data with only levels of black ink/toner when color management is not specified in the print job. A system converts input data of a print job to a CMYK color space of a printer by processing a lookup table of color values for the color space of the input data based on a detected color space of the input data to identify gray color values of the lookup table. The system also determines that these gray color values produce an output in the CMYK color space of the printer that includes one or more of cyan, magenta, and yellow color components. The system replaces the gray color values with black color values and corresponds the black color values of the lookup table with gray color values of the input data for conversion of the input data.

21 Claims, 6 Drawing Sheets

FORCE K PROCESSING IN A CMYK COLOR CONVERSION

FIELD OF THE INVENTION

The invention relates generally to the field of color conversions, and in particular, to color conversion of input data that forces black (K) color values for various levels of gray in a Cyan (C), Magenta (M), Yellow (Y), and black (K) color space.

BACKGROUND

In color printing, a printer prints input data onto a tangible medium, such as paper, by converting colors in the input data to a color space of the printer. A CMYK printer, for example, has a color space that is used to represent the input data with various levels of cyan, magenta, yellow, and black ink or toner. Before the input data is printed, the input data is converted to the color space of the CMYK printer.

Generally, the input data is prepared for printing by configuring the input data in a print job that directs a color management system to manage the color printing. For example, the color gamut of the printer may be smaller than that of the incoming input data. A host system may therefore configure the input data in a print job via specialized formats known as page description languages (PDLs) that direct a color management system to map the incoming input data to the color gamut of the printer. In doing so, the PDL encodes the input data such that it may be translated into a rasterized format for the printer before it is printed.

The PDL may also direct the color management system to conserve ink/toner during the printing process. For example, in CMYK printing, cyan, magenta, and yellow ink/toner is generally more expensive than black ink/toner. The color management system may therefore compute certain CMYK replacement values for the converted CMYK input data so as to reduce the amount of cyan, magenta, and/or yellow ink/toner being used during printing while maintaining an aesthetically/perceptually similar printed image.

One method of color management is a process known as "Force K" that replaces all black and gray color values of a converted image with various levels of black ink/toner (i.e., K color values). In this process, the color management system employs ICC color profiles to convert all color values of input data to a color space of an output device. Thereafter, the color management system identifies the black color values converted by the ICC color profiles and replaces them with K color values. Thus, all levels of cyan, magenta, and yellow in those black and gray color values are set to zero during CMYK printing, which as mentioned reduces the overall cost of printing.

However, not all print jobs are alike. In many instances, customers create print jobs with input data from devices (e.g., imaging device data) that do not specify any type of color management. Accordingly, the printer is tasked with printing the input data without instructions for performing color conversion. For example, a customer may generate a print job having CMYK input data without specifying any type of color management to reduce various levels of cyan, magenta, and/or yellow ink/toner. The CMYK input data may be generated directly from an input device or generated from a color conversion of the color space thereof. Once received by the printer, the printer simply applies various levels of cyan, magenta, yellow, and black ink/toner to the print medium as directed by the CMYK input data. Thus, gray and black color values of the input data are often printed with levels of cyan, magenta, yellow, and black ink/toner when they could have been simply represented with various levels of black ink/toner. Such results in the unnecessary use of the more expensive cyan, magenta, and yellow ink/toner.

SUMMARY

Embodiments described herein provide a Force K system for replacing black, gray, and almost gray color values of input data that would normally use various levels of cyan, magenta, yellow, and black ink/toner with only levels of black ink/toner when color management is not specified in the print job. The embodiments herein, therefore, reduce the overall cost of printing by reducing the amounts of the more expensive cyan, magenta, and yellow ink/toner being used. In one embodiment, a system is operable to convert input data of a print job to a cyan, magenta, yellow, and black (CMYK) color space of a printer. The system includes a detector operable to detect a color space of the input data and a processor operable to process a lookup table of color values for the color space of the input data based on the detected color space of the input data to identify gray color values in the lookup table. The processor is further operable to determine that the identified gray color values of the lookup table produce an output in the CMYK color space of the printer that includes one or more of cyan, magenta, and yellow color components, and to replace the identified gray color values of the lookup table that produce said output with black color values. Additionally, the processor is operable to correspond the black color values of the lookup table with gray color values of the input data to convert the corresponding gray color values of the input data to the CMYK color space of the printer.

In one embodiment, the color space of the input data is a CMYK color space, and the processor is further operable to convert remaining color values of the input data to the CMYK color space of the printer using the color values of the lookup table. In another embodiment, the color space of the input data is a red, green, blue (RGB) color space, and the processor is further operable to convert remaining color values of the RGB input data to the CMYK color space of the printer through a RGB to CMYK color conversion process. In this regard, the lookup table may include color values of the RGB color space converted to the CMYK color space of the printer. The processor may be further operable to establish a boundary about a gray axis of the lookup table of color values to identify the color values of the lookup table. In doing so, the processor may reduce chroma error at the boundary of the gray axis to improve identification of the color values of the lookup table. Alternatively or additionally, the processor may process the boundary of the gray axis with a least square polynomial to improve identification of the color values of the lookup table.

The various embodiments disclosed herein may be implemented in a variety of ways as a matter of design choice. For example, the embodiments may take the form of physical machines, computer hardware, software, firmware, or combinations thereof. In another embodiment, a computer readable medium is operable to store software instructions for converting the input data to the color space of the printer. These software instructions are configured so as to direct the processor or some other processing system to operate in the manner described above. Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
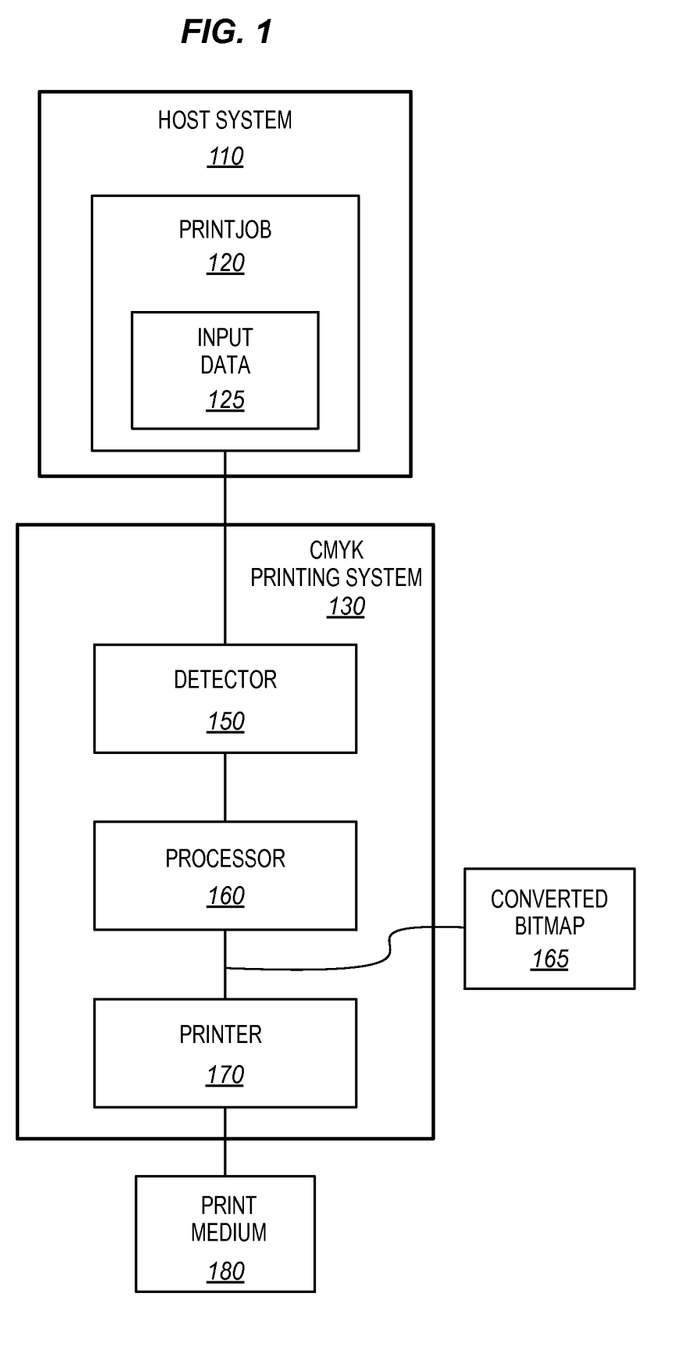
FIG. 1 is a block diagram of a printing system in an exemplary embodiment.

FIG. 1 is a block diagram of a CMYK printing system 130 in an exemplary embodiment. A host system 110 is in communication with the printing system 130 to print a print job 120 having input data 125 onto a print medium 180 via a printer 170. The resulting print medium 180 may be printed in color and/or in any of a number of gray shades, including black and white. The host system 110 may comprise any computing device, such as a personal computer or a server that is operable to prepare a print job for printing via the printer 170. The print job 120 may be any file or data that describes how the input data 125 prints on the print medium 180. For example, the print job 120 may include PostScript data, Printer Command Language ("PCL") data, and/or any other page description language. The printing system 130 may be capable of printing relatively high volumes (e.g., greater than 100 pages per minute) using various levels of CMYK toner or ink. The print medium 180 may be continuous form paper, cut sheet paper, and/or any other medium suitable for printing. The printing system 130, in one generalized form, includes the printer 170 that presents a bitmap information (i.e., converted bitmap 165) onto the print medium 180 (e.g., via toner or ink) based on the input data 125.

The printing system 130 includes a detector 150 and the processor 160. The detector 150 may be any system, device, software, circuitry and/or other suitable component operable to receive the print job and perform initial processing of the input data 125 included therein. The processor 160 may be any system, device, software, circuitry, and/or other suitable component operable to convert the input data 125 to the bitmap 165 based on the initial processing of the detector 150 for presentation to the printer 170 and subsequent printing thereof. The processes of the detector 150 and the processor 160 are now discussed in reference to flow chart 200 of FIG. 2.

Figure 2:
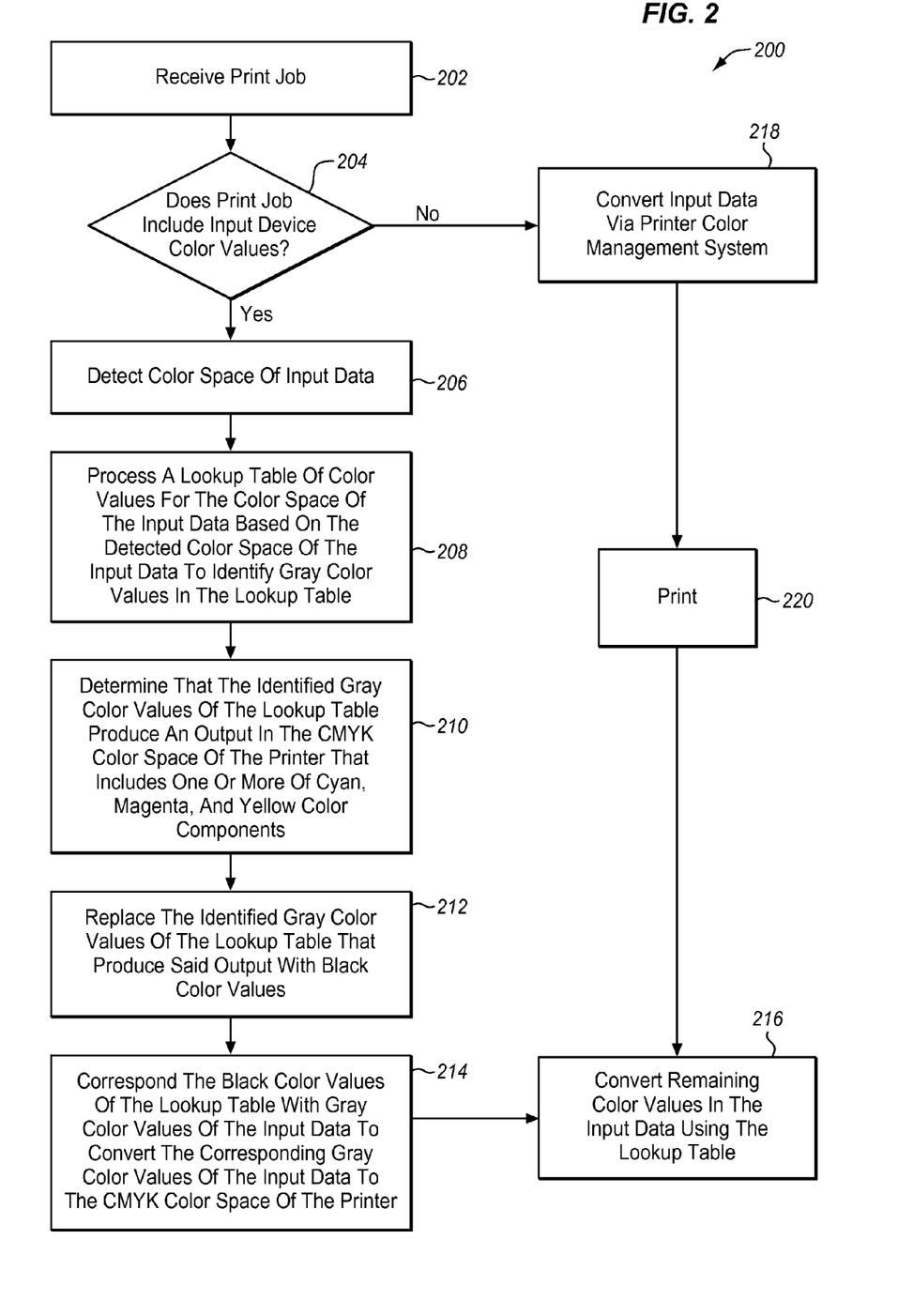
FIG. 2 is a flow chart of a method of Force K color conversion in an exemplary embodiment.

FIG. 2 is a flow chart 200 illustrating a method of Force K color conversion in an exemplary embodiment. In this embodiment, the detector 150 receives the print job 120 to perform initial processing of the input data 125, in the process element 202. In doing so, the detector 150 determines whether the input data 125 includes input device color values, in the process element 204. For example, the detector 150 may determine that the input data 125 is "device path" input data that has been configured within the print job 120 directly from an input imaging device or some color conversion process of the input data from that input device. Such device path input data does not designate any form of color management processing to be performed by the printing system 130. Thus, if no color management processing is to be performed, then the detector 150 detects the color space of the input data 125, in the process element 206, such that it may be processed by the processor 160. Alternatively, if the print job 120 does specify that the printing system 130 is to employ color management processing, the printing system 130 converts the input data 125 to the color space of the printer 170 via a color management system, in the process element 218, such that the print job may be printed, in the process element 220. Various forms of color management exist, many of which use defined International Color Consortium (ICC) color profiles available in a Color Matching Module (CMM) at the operating system level of the CMYK printing system 130.

With the color space of the input data 125 detected by the detector 150 (i.e., in the process element 206), the processor 160 retrieves and processes a lookup table of color values for the color space of the input data 125, in the process element 208. The processor 160 does so to identify the gray color values of the lookup table. For example, once the detector 150 establishes the color space of the input data 125, the processor 160 may retrieve an identity lookup table that comprises the same color values of the input data 125. Within the lookup table, the processor 160 may determine a gray "axis" where color values are black, gray, or at least approximately gray (described in greater detail below). The processor 160 may then determine that certain identified gray color values of the lookup table produce an output in the CMYK color space of the printer 170 that include one or more of cyan, magenta, and/or yellow color values, in the process element 210. After determining such, the processor 160 replaces these color values in the lookup table, in the process element 212. The processor 160 may then correspond the black color values of the lookup table with gray color values of the input data 125 to convert the corresponding gray color values of the input data 125 to the CMYK color space of the printer 170, in the process element 214. That is, the processor 160 replaces the gray color values of the input data 125 with various K values of the lookup table having the CMY values "zeroed out" (e.g., 0,0,0,K). For those color values that are deemed not gray, the processor 160 uses the lookup table to convert the remaining color values in the input data 125 to the color space of the printer 170, in the process element 216. Thereafter, the processor 160 transfers a converted bitmap 165 to the printer 170 for printing, in the process element 220.

Although shown and described with respect to the input data 125 having a CMYK color space, the invention is not intended to be so limited. The Force K method of the flow chart 200 may be implemented to convert the input data 125 from other color spaces (e.g., a red green blue, or "RGB" color space) to the CMYK color space of the printer 170. An example of this conversion is now shown and described in FIG. 3 along with a more detailed conversion of a CMYK color space of the input data 125.

Figure 3:
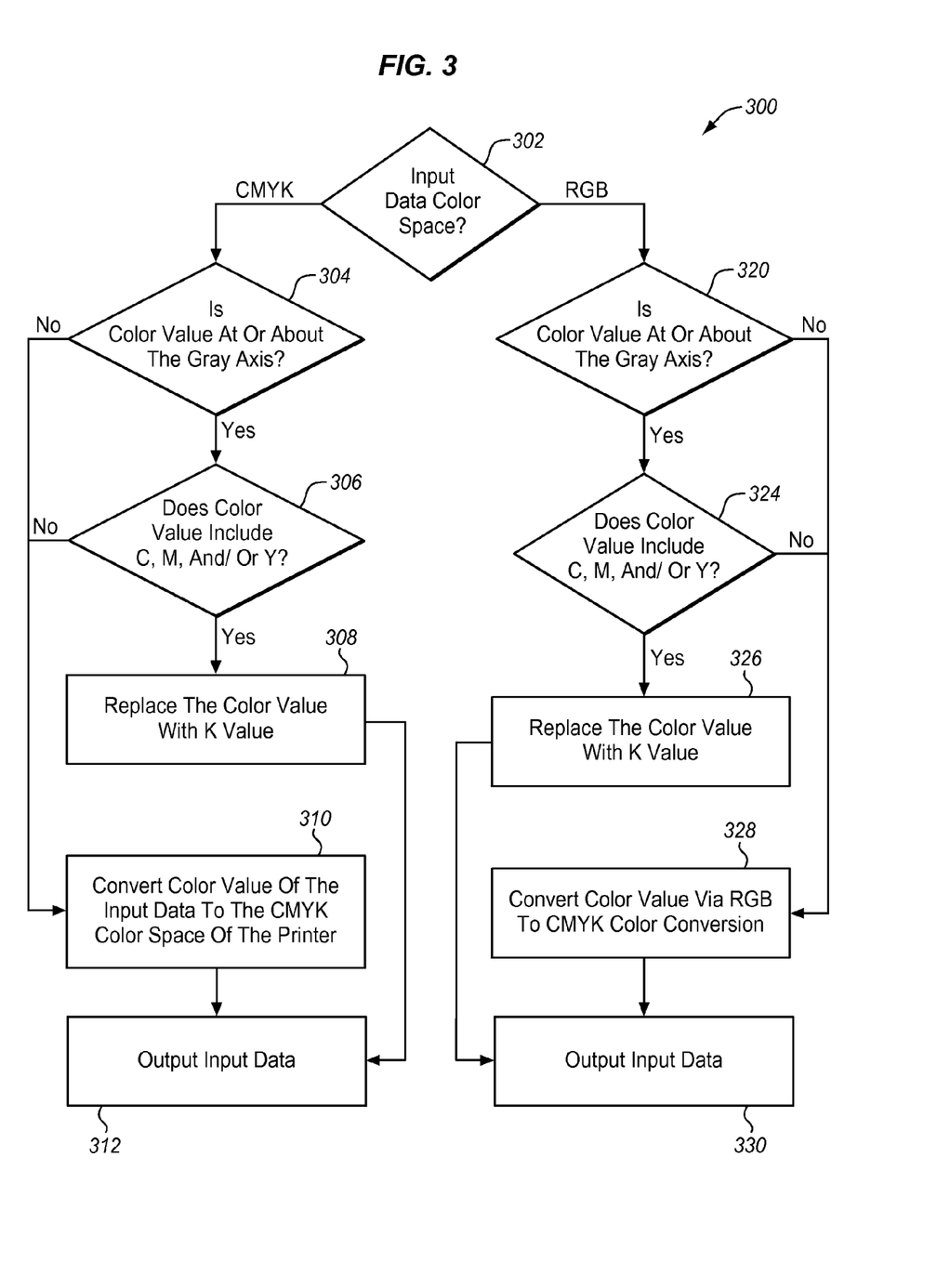
FIG. 3 is a more detailed flow chart of the method of FIG. 2 in an exemplary embodiment.

FIG. 3 is a more detailed flow chart 300 of the method of FIG. 2 in an exemplary embodiment. More specifically, the flow chart 300 illustrates a more detailed example of the process elements 206-216 of FIG. 2 as applied to process multiple input data 125 having different color spaces. In this embodiment, the detector 150 detects the color space of the input data 125, in the process element 302, to determine whether the color space is a CMYK color space or an RGB color space. If the color space of the input data 125 is a CMYK color space, the detector indicates such to the processor 160 such that the processor 160 may retrieve an identity lookup table of color values for the CMYK color space of the input data 125. That is, once the detector determines the color space of the input data 125, the processor locates and retrieves a lookup table of color values that matches those color values in the input data 125. The processor 160 reads each color value of the lookup table to determine whether it is located at or about a gray axis of the lookup table, in the process element 304. For example, the CMYK color space is a four dimensional color space having values of cyan, magenta, yellow, and black. That color space includes a gray axis where color values, although gray, include various levels of cyan, magenta, and yellow when printed. If a color value of the input data 125 is not at or about the gray axis, the processor 160 leaves the color value of the lookup table unchanged and converts a corresponding color value of the input data 125 to the color space of the printer 170, in the process element 310.

If the color value of the lookup table is at or about the gray axis, the processor 160 determines if the color value includes cyan, magenta, and/or yellow components that would direct the printer 162 output various levels of cyan, agenda, and/or yellow ink/toner, in the process element 306. If not, the processor 160 may allow the gray color value to simply pass or convert a corresponding color value of the input data 125 via the lookup table, in the process element 310. Otherwise, the processor 160 replaces that color value with a K value as described above (e.g., 0,0,0,K), in the process element 308.

The process elements 304-310 are performed for each color value in the lookup table and applied to the input data 125 for conversion. Once each of the color values of the input data 125 is converted via the lookup table, the converted input data 125 is then output in the process element 312 (e.g., as the converted bitmap 165). Thus, the black, gray, and approximately gray color values of the input data 125 are presented to the printer 170 as the converted bitmap 165 with only K color components while leaving the remaining color values of the input data 125 virtually unchanged, thereby reducing the amount of cyan, magenta, and yellow color components of the ink/toner of the printer 170.

If the detector 150 determines that the color space of the input data 125 is an RGB color space, the detector 150 indicates such to the processor 160 such that it may retrieve a lookup table that includes color values of the RGB color space that have been converted to a CMYK color space of the printer 170. For example, a color conversion from the RGB color space of the input data 125 to the CMYK color space of the printer 170 may have been previously performed and stored as a lookup table that is accessible to the processor 160. The processor 160 determines if a color value in the lookup table is at or about a gray axis of the RGB color space, in the process element 320. If not, the processor 160 simply converts the RGB color value of the input data 125 to the CMYK color space of the printer 170 via the RGB to CMYK color conversion lookup table, in the process element 328. If, however, the processor 160 determines that the color value of the lookup table is at or about the gray axis of the RGB color space, the processor 160 determines whether that color value includes a cyan, magenta, and/or yellow component, in the process element 324. If not, the color value of the lookup table is applied to the input data 125 to convert a corresponding color value of the input data 125 to the CMYK color space of the printer 170 via the RGB to CMYK color conversion lookup table, in the process element 328. Otherwise, the processor 160 replaces that color value with a K value as described above (e.g., 0,0,0,K), in the process element 326. Again, once each of the RGB color values of the lookup table have been applied to the input data 125, the input data 125 is output, in the process element 330, as the converted bitmap 165. The invention is not intended be limited to any particular RGB to CMYK color conversion that generates the RGB to CMYK color conversion lookup table. Various algorithms exist to perform such a color conversion and such may be selected as a matter of design choice. One example of such an algorithm is illustrated as follows:

$$minCMY = min\{1-R, 1-G, 1-B\};$$

$$C = (1-R-minCMY)/(1-minCMY);$$

$$M = (1-G-minCMY)/(1-minCMY);$$

$$Y = (1-B-minCMY)/(1-minCMY); \text{ and}$$

$$K = minCMY.$$

The criteria for determining whether a color value is at or about the gray axis of the color space may be performed in a variety of manners. For example, for the CMYK color space, some boundary of CMYK values may be predefined based on a perceptual model where the combination of color CMYK components appear to an individual as black, gray, or approximately gray. The processor 160 may identify these boundaries by the proximity of various CMYK components to one another. For example, if the absolute values two proximate CMY components are less than a predefined boundary, then the color value of the input data 125 is deemed to be black, gray, or approximately gray. An example of such color value determination is performed as follows:

$$|C-M| < boundary;$$

$$|C-Y| < boundary; \text{ and}$$

$$|M-Y| < boundary.$$

If each of these conditions is true for a color value of the input data 125 that is under examination, then that color value is set to a single K value zeroing out the C, M, and Y values (i.e., again, 0,0,0,K). In one specific embodiment, the K value is established as:

$$R = (1-C) \times (1-K); G = (1-M) \times (1-K); B = (1-Y) \times (1-K); \text{ and}$$

$$Gray = 1 - (0.3 \times R + 0.59 \cdot G + 0.11 \times B).$$

In some instances, chroma error can be introduced in this process. For example, chroma error = $\sqrt{a^{*2} + b^{*2}}$ and can be introduced because the color gamut of the input data 125 is larger than the color gamut of the printer 170. However, for typical inkjet printers, colors below L* equal to 40 (i.e., of a CIELab perceptual color space) are outside the gamut of the printer 170. Accordingly, these colors may be ignored by the processor 160 during the Force K process because they will not print.

A similar criterion for determining whether a color value is at or about the gray axis of the color space may be performed for the RGB color space. For example, some boundary of RGB values may be predefined based where the combination of color RGB components to appear to an individual as black, gray, or approximately gray. In this regard, the processor 160 may identify these boundaries by the absolute values of various RGB components subtracted from one another. If the absolute values are less than the predefined boundary, then the color value of the input data 125 is deemed to be black, gray, or approximately gray. An example of such color value determination is performed as follows:

$|R-G|<\text{boundary}$;

$|R-B|<\text{boundary}$; and $|G-B|<\text{boundary}$.

If each of these conditions is true for a color value of the input data 125 that is under examination, then that color value is set to a single K value zeroing out the C, M, and Y values (i.e., again, 0,0,0,K). In one specific embodiment, the K value is established as:

$$\text{Gray}=1-(0.3\times R+0.59\times G+0.11\times B).$$

From there, each of the remaining color values of the input data 125 in the RGB color space may be converted to the CMYK color space of the printer 170 using an RGB to CMYK color conversion process.

Additionally, certain assumptions can be made about color perception as colors become more or less colorful. For example, the Force K process may be configured to modify or reduce the boundary limit as the color values near the gray axis become lighter based on the uniform color space of CIELab. An example of such is shown in graph 400 of FIG. 4. The graph 400 shows chroma error 401 versus gray color values 402. The line 403 is plotted based on a linear interpolation of chroma error where gray ranges between 0 and 0.9 because gray values after 0.9 are essentially out of the gamut of the printer 170. A gray value may thus be "stretched" from a range of 0 to 0.9 to a range of 0 to 1.0 for the same corresponding chroma error values to achieve a fully gray range.

Figure 4:
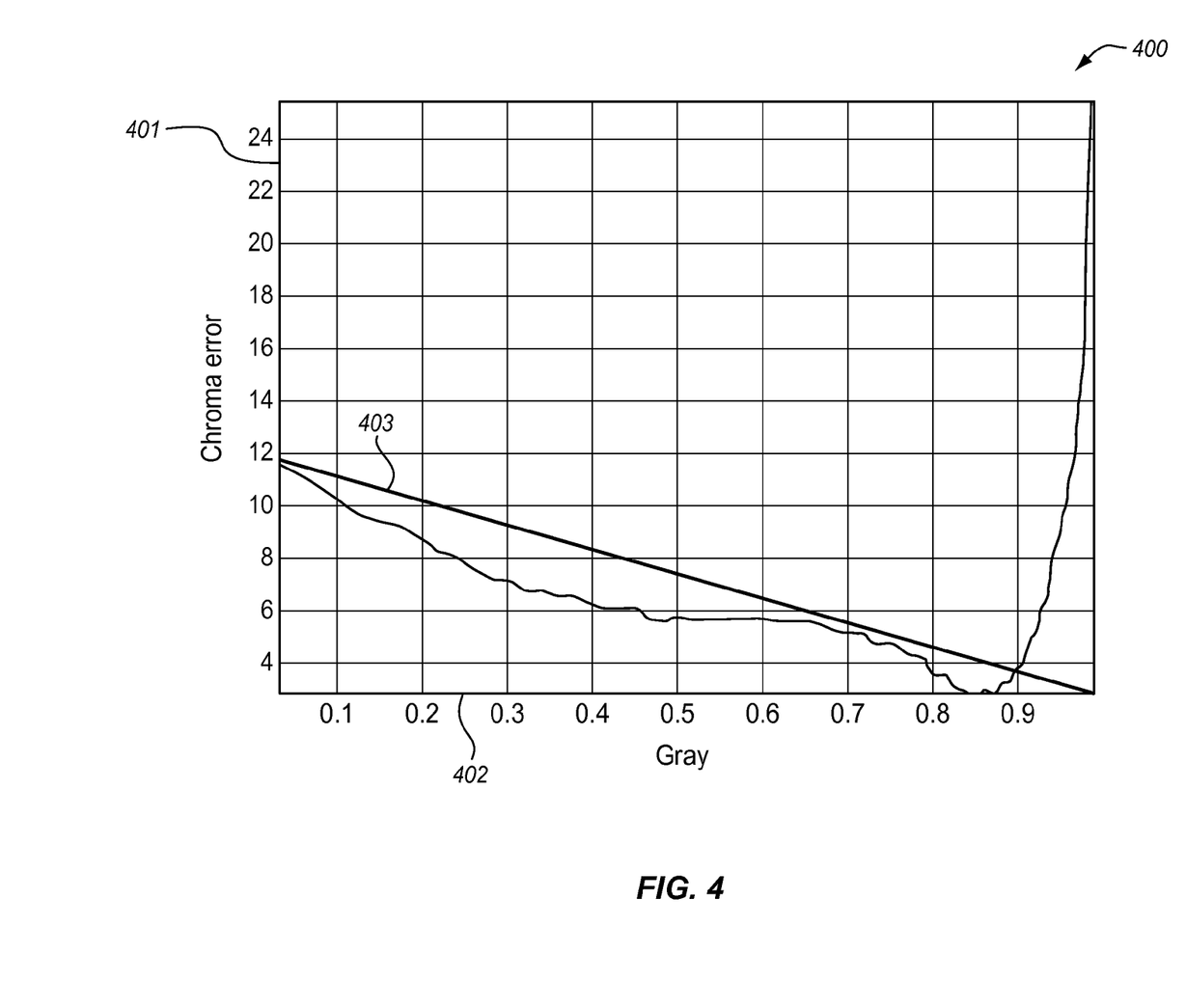
FIGS. 4 and 5 are graphs illustrating K replacement of Force K color conversion in an exemplary embodiment
Figure 5:
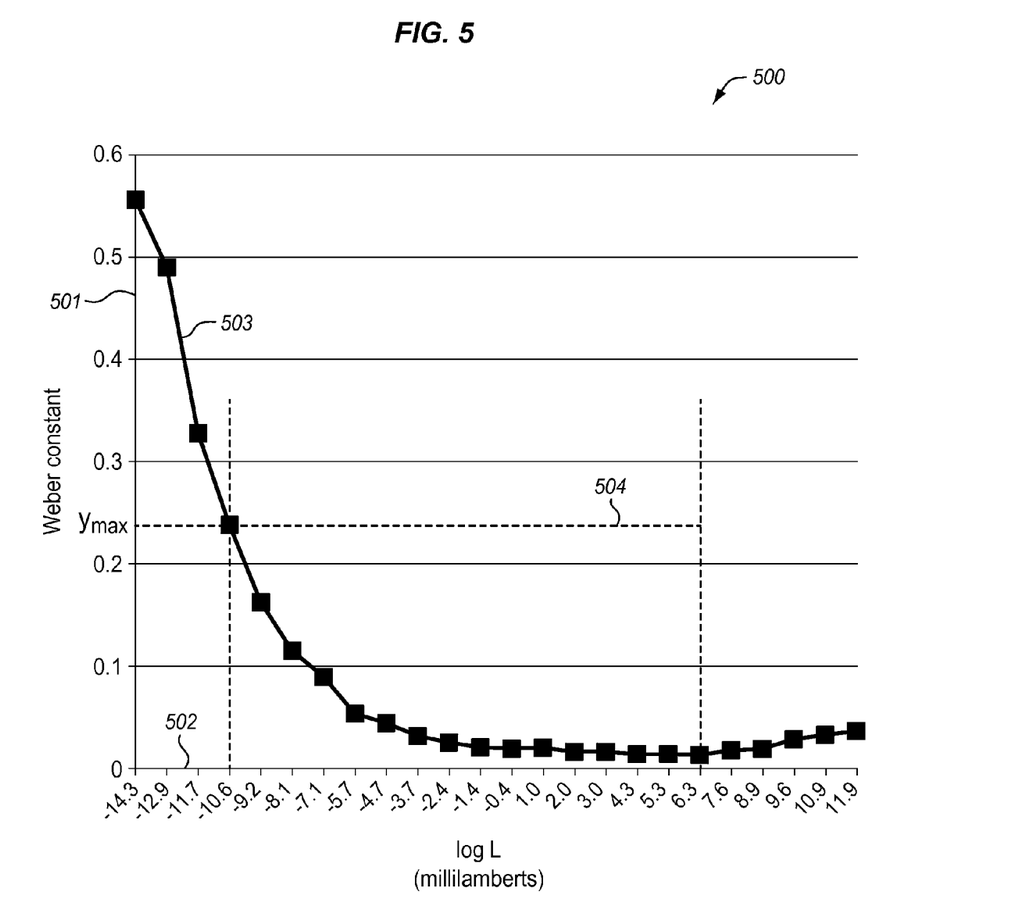

For improved performance, a more accurate model such as the least square polynomial fit may be used. In this regard, the boundary may be established as follows:

$$\text{boundary} = \text{boundary\_limit}\left[\frac{6.0}{12-(9\times \text{gray color value})}\right],$$

where the boundary_limit=10. Performance may be further improved through the adjustment of the parameters above. For example, the Force K boundary to render as disclosed herein generally decreases as color becomes lighter. Thus, an alternate approach may be to base this decrease on the general law of sensory thresholds stating the "just noticeably difference" (JND) between one stimulus and another is a constant fraction. The fraction, called the Weber fraction, is a constant within anyone's sense modality for a given set of observing conditions. However, the results obtained by Konig and Brodhun in 1839 for human eyes indicate that the Weber fraction is not constant for the range of luminances studied. These results illustrated, that for white light from the lowest perceptible illumination to the range of luminances herein, the eye becomes painfully dazzled. As the Weber constant is a reciprocal of eye sensitivity, the sensitivity drops quickly as the luminance becomes weak. Perceiving colors printed on paper assumes an operational range for the human eye that excludes extreme dark and light regions. Using this operational range established for the Konig and Brodhun curve for the Weber constant, the parameter boundary used for black enforcement the gray of each color value is as follows:

$$\text{boundary} = \text{boundary\_limit}\left(\frac{y}{y_{max}}\right),$$

where the boundary_limit is a user-specified parameter and $y_{max}$ is the Weber constant 501 of the left boundary of the operational range 502, as illustrated in graph 500 of FIG. 5. More specifically, the graph 500 illustrates the relative lightness 503 of a given gray value through the operational range 504 of lightness of the printer 170 (e.g., in log L, mililamberts). Assuming that the left boundary of the operational range 504 corresponds to the relative lightness of black color (e.g., the maximum black density) and the right boundary corresponds to the relative lightness of white color values, a fourth degree polynomial may be used to approximate the Weber constant curve to find y and derive the gray replacement value of "0,0,0,K".

Figure 6:
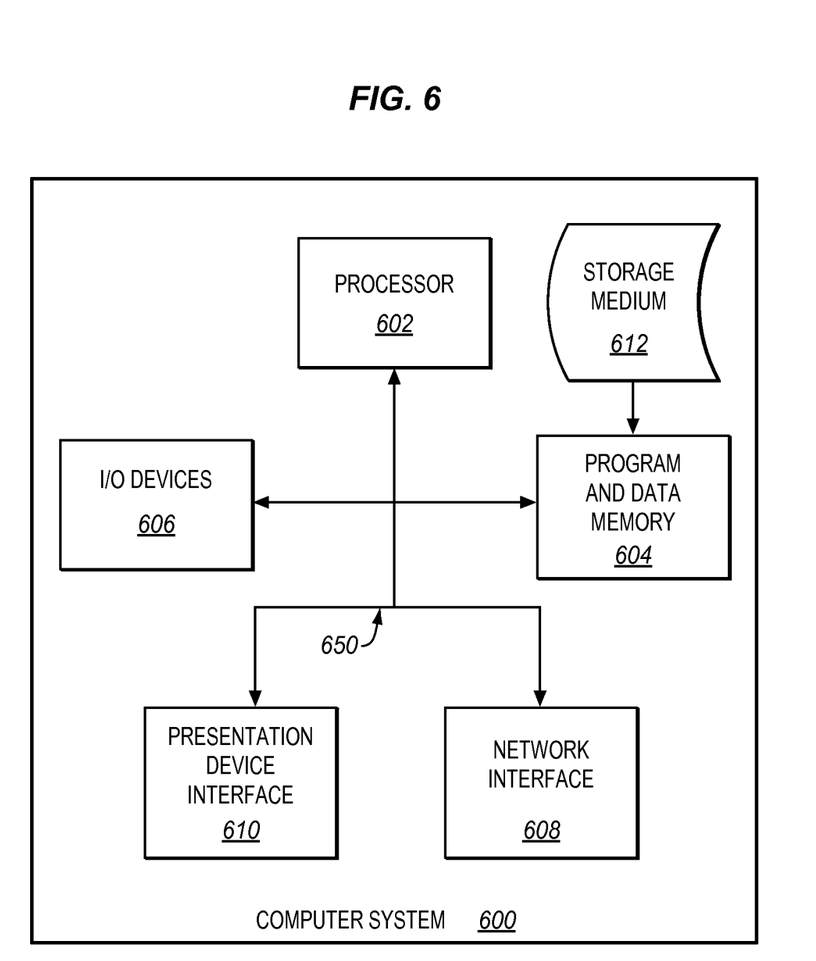
FIG. 6 is a block diagram of a computer system operable to execute computer readable medium embodying programmed instructions to perform desired functions in an exemplary embodiment.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 6 is a block diagram depicting a processing system 600 also operable to provide the above features by executing programmed instructions and accessing data stored on a computer readable storage medium 612. In this regard, embodiments of the invention can take the form of a computer program accessible via the computer-readable medium 612 providing program code for use by a computer or any other instruction execution system. For the purposes of this description, computer readable storage medium 612 can be anything that can contain, store, communicate, or transport the program for use by the computer.

The computer readable storage medium 612 can be an electronic, magnetic, optical, electromagnetic, infrared, or semiconductor device. Examples of computer readable storage medium 612 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 600, being suitable for storing and/or executing the program code, includes at least one processor 602 coupled to memory elements 604 through a system bus 650. Memory elements 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc) can be coupled to the system either directly or through intervening I/O controllers. Network adapter interfaces 608 may also be coupled to the system to enable computer system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 610 may be coupled to the system to interface to one or more presentation devices, such as printing systems and displays for presentation of presentation data generated by processor 602.

Although specific embodiments are described herein, the scope of the invention is not limited to those specific embodiments. The scope of the invention is defined by the following claims and any equivalents thereof.

We claim:

1. A system operable to convert input data of a print job to a cyan, magenta, yellow, and black (CMYK) color space of a printer, the system comprising:
   a detector operable to detect a color space of the input data in response to a determination that the input data is configured within the print job without a specified color management scheme; and
   a processor operable to:
   process a lookup table of color values for the color space of the input data to identify gray color values in the lookup table;
   determine that the identified gray color values of the lookup table produce an output in the CMYK color space of the printer that includes one or more of cyan, magenta, and yellow color components;
   replace the identified gray color values of the lookup table that produce the output with black color values; and
   correspond the black color values of the lookup table with gray color values of the input data to convert the corresponding gray color values of the input data to the CMYK color space of the printer.

2. The system of claim 1, wherein:
   the color space of the input data is a CMYK color space, and
   the processor is further operable to convert remaining color values of the input data to the CMYK color space of the printer using the color values of the lookup table.

3. The system of claim 1, wherein:
   the color space of the input data is a red, green, blue (RGB) color space, and
   the processor is further operable to convert remaining color values of the RGB input data to the CMYK color space of the printer through a RGB to CMYK color conversion process.

4. The system of claim 1, wherein:
   the color space of the input data is a red, green, blue (RGB) color space, and
   the lookup table includes color values of the RGB color space converted to the CMYK color space of the printer.

5. The system of claim 1, wherein:
   the processor is further operable to establish a boundary about a gray axis of the lookup table of color values to identify the gray color values of the lookup table.

6. The system of claim 5, wherein:
   the processor is further operable to reduce chroma error at the boundary of the gray axis to improve identification of the gray color values of the lookup table.

7. The system of claim 5, wherein:
   the processor is further operable to process the boundary of the gray axis with a least square polynomial to improve identification of the gray color values of the lookup table.

8. A method of converting input data of a print job to a cyan, magenta, yellow, and black (CMYK) color space of a printer, the method comprising:
   detecting a color space of the input data in response to a determination that the input data is configured within the print job without a specified color management scheme;
   processing a lookup table of color values for the color space of the input data to identify gray color values in the lookup table;
   determining that the identified gray color values of the lookup table produce an output in the CMYK color space of the printer that includes one or more of cyan, magenta, and yellow color components;
   replacing the identified gray color values of the lookup table that produce the output with black color values; and
   corresponding the black color values of the lookup table with gray color values of the input data to convert the corresponding gray color values of the input data to the CMYK color space of the printer.

9. The method of claim 8, wherein:
   the color space of the input data is a CMYK color space, and
   the method further comprises converting remaining color values of the input data to the CMYK color space of the printer using the color values of the lookup table.

10. The method of claim 8, wherein:
    the color space of the input data is a red, green, blue (RGB) color space, and
    the method further comprises converting remaining color values of the RGB input data to the CMYK color space of the printer through a RGB to CMYK color conversion process.

11. The method of claim 8, wherein:
    the color space of the input data is a red, green, blue (RGB) color space, and
    the lookup table includes color values of the RGB color space converted to the CMYK color space of the printer.

12. The method of claim 8, wherein:
    the method further comprises establishing a boundary about a gray axis of the lookup table of color values to identify the gray color values of the lookup table.

13. The method of claim 12, wherein:
    the method further comprises reducing chroma error at the boundary of the gray axis to improve identification of the gray color values of the lookup table.

14. The method of claim 12, wherein:
    the method further comprises processing the boundary of the gray axis with a least square polynomial to improve identification of the gray color values of the lookup table.

15. A non-transitory computer readable medium comprising software instructions that, when executed on a processor, are operable to direct the processor to convert input data of a print job to a cyan, magenta, yellow, and black (CMYK) color space of a printer, the software instructions being further operable to direct the processor to:
    to detect a color space of the input data in response to a determination that the input data is configured within the print job without a specified color management scheme;
    to process a lookup table of color values for the color space of the input data to identify gray color values in the lookup table;
    to determine that the identified gray color values of the lookup table produce an output in the CMYK color space of the printer that includes one or more of cyan, magenta, and yellow color components;
    to replace the identified gray color values of the lookup table that produce the output with black color values; and
    to correspond the black color values of the lookup table with gray color values of the input data to convert the corresponding gray color values of the input data to the CMYK color space of the printer.

16. The computer readable medium of claim 15, wherein:
the color space of the input data is a CMYK color space, and
the software instructions are further operable to direct the processor to convert remaining color values of the input data to the CMYK color space of the printer using the color values of the lookup table.

17. The computer readable medium of claim 15, wherein:
the color space of the input data is a red, green, blue (RGB) color space, and
the software instructions are further operable to direct the processor to convert remaining color values of the RGB input data to the CMYK color space of the printer through a RGB to CMYK color conversion process.

18. The computer readable medium of claim 15, wherein:
the color space of the input data is a red, green, blue (RGB) color space, and
the lookup table includes color values of the RGB color space converted to the CMYK color space of the printer.

19. The computer readable medium of claim 15, wherein:
the software instructions are further operable to direct the processor to establish a boundary about a gray axis of the lookup table of color values to identify the gray color values of the lookup table.

20. The computer readable medium of claim 19, wherein:
the software instructions are further operable to direct the processor to reduce chroma error at the boundary of the gray axis to improve identification of the gray color values of the lookup table.

21. The computer readable medium of claim 19, wherein:
the software instructions are further operable to direct the processor to process the boundary of the gray axis with a least square polynomial to improve identification of the gray color values of the lookup table.

* * * * *